United States Patent [19]  [11]  4,125,020
McClure  [45]  Nov. 14, 1978

[54] FLOW MONITORING
[75] Inventor: Charles L. McClure, Malvern, Pa.
[73] Assignee: Pro-Tech, Inc., Paoli, Pa.
[21] Appl. No.: 863,862
[22] Filed: Dec. 23, 1977
[51] Int. Cl.² .............................................. G01F 1/20
[52] U.S. Cl. .................................................. 73/215
[58] Field of Search ....................... 73/215; 138/45, 46
[56] References Cited
U.S. PATENT DOCUMENTS

| | | | |
|---|---|---|---|
| 1,190,400 | 7/1916 | Giele | 73/215 |
| 3,301,050 | 1/1967 | McNulty | 73/215 |
| 4,034,607 | 1/1977 | Martig, Jr. | 73/215 |

Primary Examiner—Herbert Goldstein
Attorney, Agent, or Firm—Charles A. McClure

[57] ABSTRACT

A probe adapted to fit into the end of a sewer or water pipe or conduit is provided with a weir plate and with a bubble tube for sensing the depth of flow over the weir and thus, determining the flow rate. A V-notch weir plate is made up of a pair of partially overlapping pieces individually joined to flexible supporting means, and one or both disjoined therefrom at the overlap. The angle of the V varies upon flexing of the supporting means, as when compressed for insertion into a pipe, and the apex of the V is at the beginning of the overlap, above the invert of the pipe when in place. The bubble tube has one or more bubble outlets at the apex level but preferably spaced upstream somewhat. Except for the weir plate itself all parts of the probe inside the pipe lie along the pipe wall for minimum disturbance of the flow.

14 Claims, 5 Drawing Figures

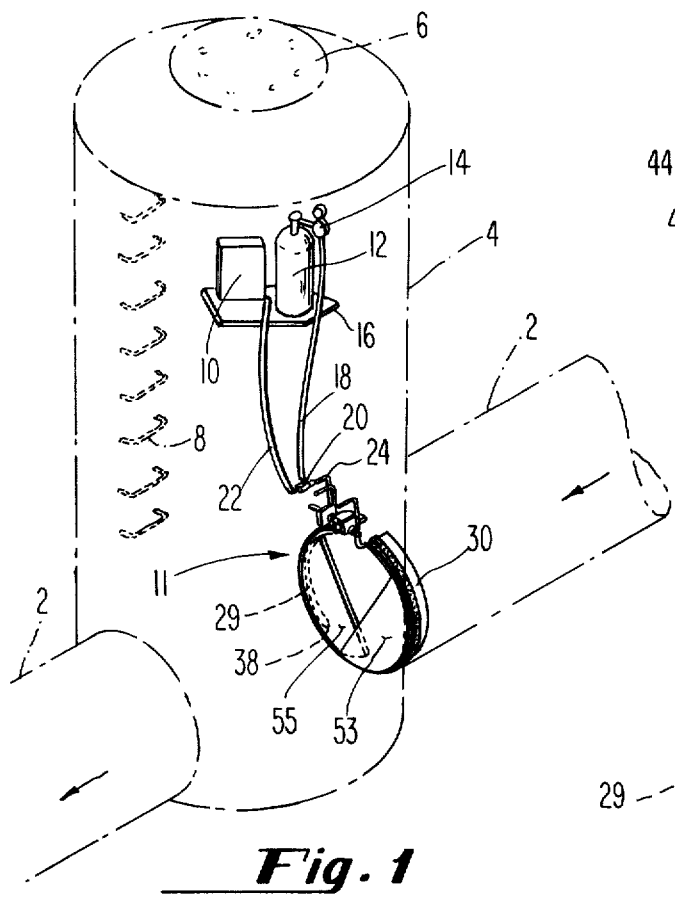
*Fig. 1*
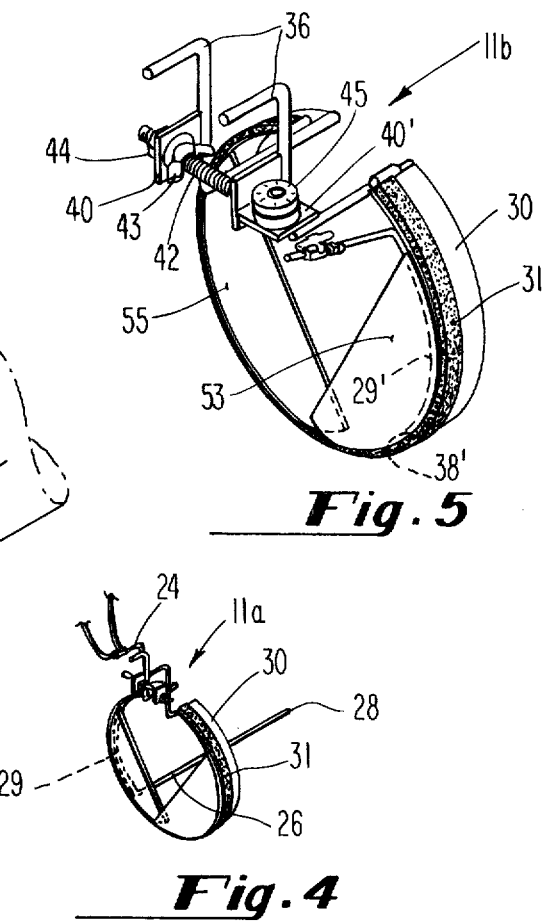
*Fig. 5*
*Fig. 4*
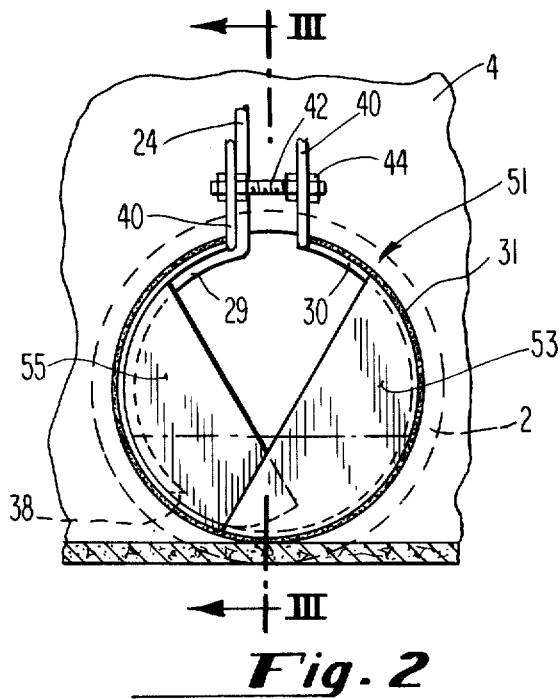
*Fig. 2*
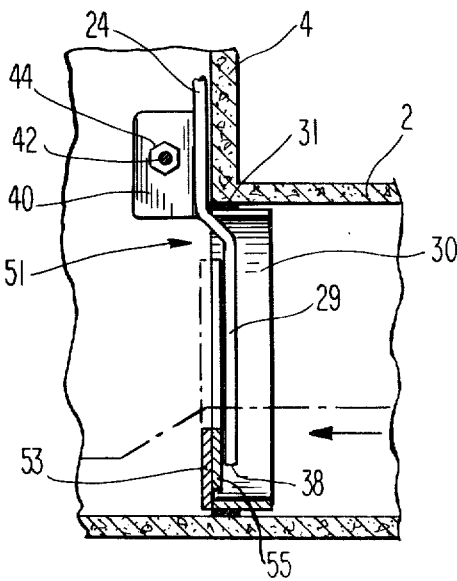
*Fig. 3*

FLOW MONITORING

This invention relates to monitoring of liquid flow in one open end of a sewer or water pipe or conduit using an insertable weirlike probe.

Martig, U.S. Pat. No. 4,034,607 discloses a novel sewer probe with a flexible supporting collar and a pair of pieces supported thereby to form a weir plate having a V-notch with its apex at the collar. When in place in a pipe, with the apex of the V at the invert of the pipe, such a weir has the advantage of permitting most debris to pass through the V rather than being trapped. However, it has correlative disadvantages, one of which is an increased likelihood of submergence (i.e., lack of completely free fall on the downstream side) when the pipe slope is relatively slight.

A primary object of the present invention is monitoring of liquid flow in sewer pipes or the like by means of an insertable weirlike probe relatively free of submergence risk.

Another object is provision of such a probe having a V-notch with base separation, that is, whose apex is spaced above the pipe invert when in use.

A further object is provision of such a probe having a bubble tube with its outlet(s) at the level of the V apex.

Other objects of the present invention, together with means and methods for attaining the various objects, will be apparent from the following description and the accompanying diagrams, which are presented by way of example rather than limitation.

FIG. 1 is a perspective view of a V-notch sensing probe of the present invention with its usage environment shown in phantom;

FIG. 2 is an end elevation of the probe of FIG. 1;

FIG. 3 is a side sectional elevation of the probe of the preceding views, taken at III—III on FIG. 2;

FIG. 4 is a like view of a first modification of the probe shown in the preceding views; and FIG. 5 is an enlarged perspective view of a further modification of such probe.

In general, the objects of the present invention are accomplished, in a liquid flow probe including weir means, means for securing the weir means in place inside a sewer pipe or the like, and means for sensing the flow depth. My improved weir means comprises a pair of transversely extending members mutually overlapping along part of their lateral extent and defining the sides of a V along part of their non-overlapping extent. The overlapping members are substantially segment-shaped, and are conjoined edgewise along their arcuate edges to flexible collar-like supporting means except that for disjunction of either or both therefrom along their mutually overlapping portions.

The apparatus of this invention is useful in combination with means for supplying sensing fluid adapted to bubble into the liquid whose flow is to be determined; and such means is illustrated.

FIG. 1 shows, in perspective, recorder 10 and supply tank 12 of pressurized fluid on shelf 16 located in manhole 4 (shown in phantom) with cover 6 on top and ladder 8 leading down thereinto, and sensing probe 11 fitting within the open end of the upstream portion of conduit 2 (also shown in phantom), the flow direction in both the upstream and downstream portions of the conduit being indicated by arrows. It will be understood that the flow stream (not shown) may be channeled through the manhole to a greater or lesser extent, but no attempt is made to illustrate such channeling.

Also visible in FIG. 1 are pressurized fluid-conducting tubing 18 between flow regulator 14 from supply tank 12 and the base of T-connection 20 (shown inverted), also similar fluid-conducting tubing 22 from the other arm of the T-connection to recorder 10. Tubing 24 leads from the other arm of the T-connection to arcuate tubing 29 supported along a similarly configured edge of supporting flexible collar 30 of probe 11.

In this probe, flexible supporting collar 30 has affixed thereto along its downstream edge, at the right and left, respectively, segment-shaped weir pieces 53 and 55. Arcuate tubing 29, which lies behind left weir piece 55 and is shown in broken lines, terminates in bubble outlet 28 at the level of the apex.

The weir pieces, which extend laterally or transversely of the stream, overlap past the lowermost point on the supporting collar and are conjoined edgewise to the collar along their non-overlapping arcuate edges to terminate about two-thirds of the total diameter above such lowermost point. Each such piece is segment-shaped, and their respective straight edges form a V, oriented upright when the probe is in place. The V apex is spaced above such point less than half the vertical extent of each piece. As shown, the included angle of the V so defined is 60°. Other suitable angles, such as 30°, 45°, and 90° are also multiples of 15°. A positive seal is assured, and minor wall irregularities are accommodated by resilient circumferential gasketing (not shown separately) of collar 30. A level indicator may be added to insure that the probe is installed with the V-notch oriented vertically.

FIG. 2 shows probe 11 from the downstream end, as installed, with the V upright. Righthand weir piece 53 is nearer to the viewer and in part covers other piece 55, the lower part of which appears in broken lines behind the corresponding part of lefthand piece 53, and the overlapped portion of which is disjoined from the collar and is curved along a smaller radius of curvature, as shown in broken lines, to accommodate compression of the collar to a smaller diameter. The apex is spaced above the lowermost point on the collar the the invert of the pipe. Brackets 40 on handles 36 are clearly shown, with interconnecting bolt 42 and nuts 44 threaded thereonto on both sides of both brackets, thereby constituting means for adjusting the separation between ends of collar 30 and, therefore, its diameter as well.

FIG. 3 shows the same probe from the side, sectioned along III—III on FIG. 2 to show the full extent of both weir plates 53 and 55. Bubble tube 29 with outlet 38 lies closely adjacent the junction of that tube and collar 30.

It will be understood that, in practice, the sensing probe is compressed in diameter manually, then is inserted into the open end of the conduit, and finally is expanded against the inside wall of the conduit by increasing the separation of the brackets through appropriate rotation of the nuts on the adjusting bolt. Friction between the probe collar and the conduit wall retains the probe in place. One or both of outer nuts 44 may be pinned or welded to the bolt at a separation corresponding to proper V-notch angle to assist in setting the angle correctly. In that event, the degree of expansion of the collar by the adjusting bolt is affected likewise.

Both the bubble tube and the supporting collar itself are configured to lie so close to the zero-velocity interface between the conduit wall and the stream that their interference with the flow is practically nil. Discharge of the pressurized fluid laterally from the bubble tube renders the back pressure applied thereto by the overlying stream essentially the static head pressure only, relatively independent of flow velocity.

The sensing probe of this invention can be removed for cleaning, if and as desired, in a minute or two and then can be replaced as simply. No special materials of construction are required, but stainless steel is a good choice, being desirably inert to practically any stream component or contaminant, and structurally strong, with a desirable degree of flexibility, although somewhat more difficult to fabricate than some less suitable materials. FIG. 4 shows modified probe 11a in perspective but without any surrounding pipe, manhole, etc. This embodiment of the present invention differs from that of the preceding views in having bubble tube extension 26 extending upstream from bubble tube 29 substantially perpendicular to weir piece 55 in such location as to lie closely adjacent the inside wall of the pipe (not shown here). Bubble outlet 28 near the end of the extension is directed laterally toward the longitudinal axis of the probe and at the level of the apex of the V.

FIG. 5 shows modified probe 11b in like view on an enlarged scale. Narrow circumferential gasket 31 on collar 30 is clearly shown in this view. The collar supports right and left weir pieces 53, 55 much as before, except that both are conjoined edgewise to the collar along substantially one-half of their mutually overlapping extent, to the mid-point of the collar, and both terminate in disjoined portions more acutely curved than the major arcuate portion of each. Bubble tube 29' extends downward arcuately along the side surface of the collar adjoining the upstream side of the right weir piece—instead of the left as before, but with like effect—and the tube extends through the V-notch at the top and has a quick-connect fitting at its end. Part of handles 36 carry respective brackets 40, 40' while bolt 42 is threaded at one end through the first bracket and affixed at its opposite end to the second bracket. Wing nut 43 and a washer are carried on the bolt and are adapted when the wing nut is threaded toward bracket 40, to expand the collar. Nut 44 is affixed to the far side of that bracket so that, when the collar has been fully expanded by the wing nut, the maximum V angle of 60° between the weir pieces is assured. Bracket 40' carries fish-eye bubble level to enable the operator to install the probe correctly, with the bisector of the angle vertical. This probe may be installed and be removed just like the probe first described.

In general, stream flow over a weir plate varies in a known mathematical relationship with the height to which the weir lifts the stream. While accuracy is favored by upstream measurement and by lateral and vertical separation of the weir opening from the confines of the stream, the compact probe of the last views is a reasonably accurate and most convenient device. The sensed pressure is conveniently converted by the recorder (as through a suitably configured non-linear chart scale or linearizing cam if non-electrical, or through appropriate electrical circuitry) into the corresponding flow, rather than merely recording the depth. As in the instance of the first probe, this probe also may be used at a given site, and the flow be calibrated there by any proper method, whereupon a chart scale, cam, or equivalent circuitry can be constructed for the flow vs. sensed pressure at that site—for high accuracy. Especially when electrical conversion of depth to flow is employed, a strain gage or equivalent upon-pneumatic differential-pressure sensing device may be substituted for the preferred bubbler.

The V-notch sensing probes of the present invention are advantageous when the normal flow is less than about a half full pipe. When the downstream slope is so slight that a weir plate with its apex at the pipe invert would be somewhat submerged but the weir plate of this invention would not be, greater accuracy can be obtained with this one. The overlap of the plate pieces also stiffens the weir plate against deformation by the flow. Although conduits with round cross-sections are so common that no other shapes are illustrated, it will be understood that other conduit shapes may be accommodated, with corresponding change in configuration of the collar or equivalent support means. Application of an appropriate flow formula or construction of a suitable flow-characterizing element is well within the capability of persons ordinarily skilled in the art. Such persons are well qualified also to appreciate the numerous advantages and benefits of the invention, some of which have been mentioned hereinabove.

Notwithstanding the foregoing description and illustration of specific embodiments of the invention, some variations have been suggested above, and other modifications may be made therein, as by adding, combining, or subdividing parts or steps, without departing from the invention itself, which is defined in the following claims.

I claim:

1. In weir means for monitoring liquid flow in a sewer or water pipe or conduit, including flexible support means adapted to be compressed for insertion thereinto and for removal therefrom and adapted to be expanded while therein for frictional retention against the inside wall thereof, the improvement comprising a pair of platelike pieces supported individually by the flexible support means in partially overlapping contiguity to form a V configuration with an apex angle subject to variation upon flexing of the support means.

2. Weir means according to claim 1, wherein the flexible support means comprises a collar adapted to conform to the inside wall of the conduit when expanded thereagainst, and each of the platelike pieces is conjoined edgewise thereto except along their mutually overlapping extent; and at least one of the pieces is disjoined therefrom along their mutually overlapping extent.

3. Weir means according to claim 2, including a bubble tube supported by and along the collar and adjacent one of the platelike pieces to terminate in a bubble outlet at the level of the apex when the V is oriented upright.

4. Weir means according to claim 3, wherein the bubble tube curves through substantially a right angle to extend away from the adjacent platelike piece and terminate in a bubble outlet at such level but spaced therefrom.

5. Weir means according to claim 3, wherein the collar is substantially circular, and each plate-like piece is segment-shaped, having a straight edge comprising one edge of the V, and having an arcuate edge conjoined to the collar, one or both such pieces being disjoined therefrom along the arcuate extent of the collar where the respective plate-like pieces overlap one another.

6. V-notch sewer probe, comprising a flexible arcuate collar, a pair of weir plate pieces supported by the collar in partially overlapping relationship with a straight edge of each such piece crossing a like edge of the other such piece to form a V-shaped opening and with an arcuate edge of each conjoined to the collar except along the mutually overlapping portions of the pieces, with a line of disjunction therefrom of at least one of the pieces along their mutually overlapping portions, and means for securing the collar against the inside wall of a sewer pipe or the like.

7. V-notch sewer probe according to claim 6, including adjustment means for flexing the collar and thereby forcing it into frictionally secured relationship against the inside wall of sewer pipe.

8. V-notch sewer probe according to claim 7, including a flexible bubble tube configured like and lying closely adjacent the collar and one of the pieces.

9. V-notch sewer probe according to claim 7, wherein the apex angle is a multipe of 15 degrees when the adjustment means has widened the apex angle of the V-shaped opening to the maximum.

10. In a liquid flow probe including weir means, means for securing the weir means in place inside of a sewer pipe or the like, and means for sensing the flow depth, the improvement in the weir means comprising a pair of transversely extending members mutually overlapping over part of their lateral extent and defining the sides of a V over part of their non-overlapping extent.

11. Liquid flow probe according to claim 10, wherein the two transversely extending members are affixed individually to the securing means and are movable individually to vary the angle included between the sides of the V upon corresponding movement of the securing means.

12. Liquid flow probe according to claim 10, wherein the apex of the V so defined is spaced, when the V is upright, a minor portion of the vertical extent of either such member above the lowermost portion thereof.

13. Liquid flow probe according to claim 10, wherein the means for sensing the flow depth includes means for conducting a sensing fluid provided from an external supply thereof and adapted to release it bubble-wise into overlying liquid when the probe is in place.

14. Liquid flow probe according to claim 13 wherein the conducting means includes a bubble tube oriented horizontally at the level of the apex, when the V is upright, and juxtaposed to end along the inside wall of the pipe when the probe is in place.

* * * * *